United States Patent [19]

Clark et al.

[11] Patent Number: 4,598,363

[45] Date of Patent: Jul. 1, 1986

[54] ADAPTIVE DELAYED POLLING OF SENSORS

[75] Inventors: Larry L. Clark; Carmen E. DeArdo; Barry A. Shaffer, all of Reynoldsburg, Ohio

[73] Assignee: AT&T Bell Laboratories, Murray Hill, N.J.

[21] Appl. No.: 511,742

[22] Filed: Jul. 7, 1983

[51] Int. Cl.⁴ .................. G06F 13/00; G06F 13/22
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,040,026 | 8/1977 | Gernelle | 364/900 |
| 4,083,229 | 4/1978 | Anway | 73/40.5 A |
| 4,117,278 | 9/1978 | Ehrlich et al. | 179/175.2 |
| 4,125,870 | 11/1978 | Suzuki et al. | 364/900 |
| 4,236,225 | 11/1980 | Jansen et al. | 364/900 |
| 4,432,481 | 2/1984 | Miller | 226/9 |
| 4,468,809 | 8/1984 | Grabowski | 382/50 |
| 4,479,194 | 10/1984 | Fogg et al. | 364/900 |
| 4,514,621 | 4/1985 | Knight et al. | 235/400 |

OTHER PUBLICATIONS

J. J. Kleber et al, *No. 1A AMARC at the Center of Billing Data Collection*, Bell Labs. Record (Jul./Aug. 1980), pp. 236-243.

Primary Examiner—Raulfe B. Zache
Assistant Examiner—A. Williams
Attorney, Agent, or Firm—Dwight A. Marshall

[57] ABSTRACT

Apparatus (100) and a method (5) are used for polling asynchronous sensors (1, 2, 3) of a computer system to optimize the data load offered by the sensors to a central processor (4). The polling apparatus and method operate in accordance with time delay status (4200, 4210, 4220) recorded in the sensor buffer stores (420, 421, 422) of the memory unit (42) of the central processor. The system determines the amount of data received in a sensor buffer store during the polling sequence and dynamically varies the value of the time delay status to optimize the load of sensor data offered the central processor.

13 Claims, 7 Drawing Figures

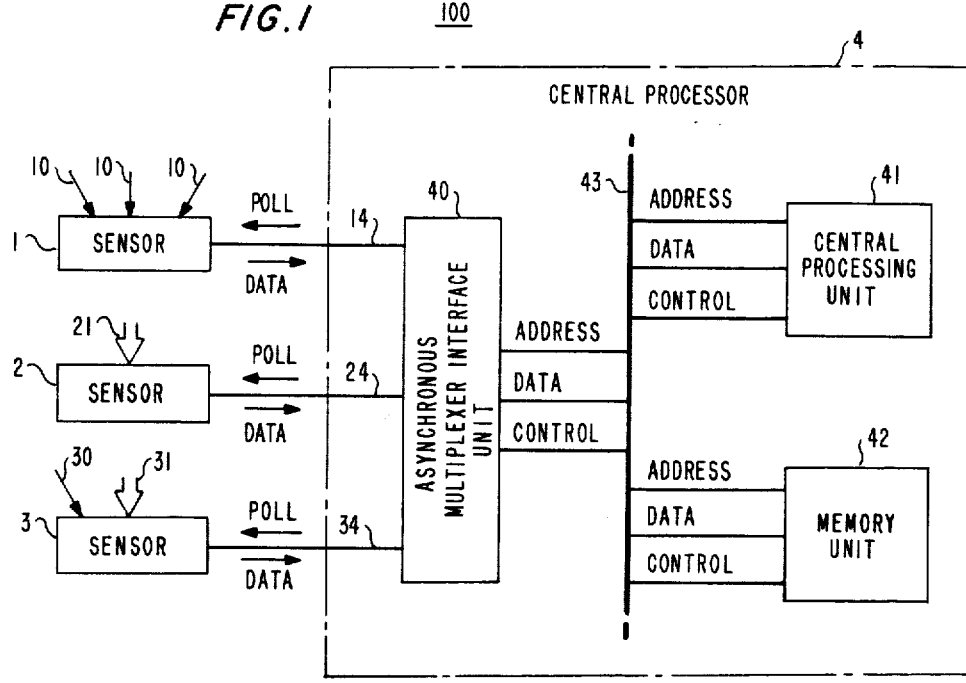

(POLL SEQUENCER 5)

ADAPTIVE DELAYED POLLING OF SENSORS

BACKGROUND OF THE INVENTION

1. Technical Field

This invention concerns computer systems. In particular, it relates to a computer system having a central processor arranged to poll and receive data from peripheral units.

2. Background

Computer systems as employed in the data communication field oftentimes comprise a central processor coupled with and arranged to process data collected by peripheral units. In a typical application as may, for example, be used in telecommunications, a peripheral unit sometimes referred to as a sensor is connected with various components of telephone switching equipment so that data generated by operation of the telephone switching equipment may be detected and received by the sensor. Periodically the central processor collects and records the data received by the sensor in a memory store and subsequently processes the data to prepare information such as traffic studies depicting call handling characteristics of the telephone switching equipment and customer call billing records. A central processor is usually coupled with a large number of sensors and is arranged to poll each sensor periodically and have the data received by the sensor collected and recorded in a memory store.

Each sensor typically has a small buffer used to store data received between polling intervals. Normally the size of the sensor buffer is selected to hold data received during the period of time between polling intervals. However a problem arises in that the amount of data received by a sensor varies with the operation of the equipment coupled with the sensor. For example, telephone switching equipment serving the metropolitan area of a large city oftentimes generates more traffic during the day than telephone switching equipment serving the city suburbs. During the evening the reverse may be true in that the telephone switching equipment serving the suburbs may generate more traffic than the metropolitan telephone switching systems. Even during the day and evening hours traffic handled by specific telephone switching equipment may vary in that there may be little traffic in metropolitan telephone switching equipment during the early morning hours with heavy traffic occurring during the later morning hours. In suburban telephone switching equipment heavy traffic may occur during the early evening hours with light traffic occurring during late evening hours.

When equipment coupled with a sensor generates more data during the period of time between polls than the sensor buffer can store, data is lost. If the interval of polling sensors is decreased then the efficiency of the computer system may be decreased in that more processor time will be spent in polling sensors having only a small amount of data stored in the sensor buffer.

Apparatus has been disclosed for controlling the flow of data between peripheral units and a central processor. This generally consists of modifying buffer apparatus to improve the characteristics of the buffer with regard to receiving the transmitting data. A problem arises with the prior art apparatus in that while it improves the efficiency of the buffer apparatus it does not improve the characteristics of the computer system in controlling the data flow from a number of sensors each arranged to detect widely varying amounts of input data at various times.

Accordingly, a need exists for a computer system arranged to smooth the data load offered by sensors to a central processor. A need also exists for a computer system having a central processor arranged to dynamically vary the time of polling sensors in response to the amount of data registered therein to effectively smooth the data load offered the central processor coupled with the sensors.

SUMMARY OF THE INVENTION

In the exemplary embodiment of the invention, a computer system having a plurality of sensors receiving data intended for processing by a central processor coupled with the sensors comprises the step of polling sensors to collect and record sensor data in associated sensor buffer stores of a memory unit of the central processor. The polling step includes a step of recording in each of the sensor buffer stores an adaptive time delay status controlling an interval of time between consecutive polls of the sensor associated with the sensor buffer store. In addition, the polling step includes a step of dynamically regulating the recorded adaptive time delay status in accordance with a proportional relationship of the received sensor data with the data capacity of the associated sensor buffer store to optimize the data load offered by the sensor to the central processor.

In accordance with a feature of the invention, a method of controlling and dynamically regulating the polling of sensors receiving data intended for processing by a central processor includes a step of reading a time delay state identifying a time interval between consecutive polls of a sensor and a timer state identifying a period of time remaining to the next poll of the sensor from an associated sensor buffer store of a memory unit into a central processing unit of the central processor. The polling method also includes steps of decrementing the read timer state and transmitting a poll command to the sensor in response to a null state registered in the decremented timer state.

In accordance with another feature of the invention, a method of polling sensors receiving data intended for processing by a central processor includes steps of reading from a sensor buffer store associated with a sensor a time delay state identifying a time interval between consecutive polls of the sensor and a timer state identifying a period of time remaining to the next sensor poll. The method also includes the steps of setting the read time delay and timer states in accordance with proportional relationships of received sensor data with the data capacity of the sensor buffer store and recording the set time delay and timer states in the sensor buffer store to control the interval of time between consecutive polls of the sensors to optimize the sensor data load offered the central processor.

In accordance with another feature of the invention, a method for polling sensors receiving data for processing by a central processor includes a step of recording in sensor buffer stores each associated with a sensor and located in a memory unit of the central processor, an adaptive time delay status controlling the rate of change in polling the sensor. The method also includes the step of incrementing the recorded time delay status in response to decreasing amounts of data received by a polled sensor to increase the rate of time change in decreasing subsequent polls of the sensor. The method also includes the step of decreasing the recorded time delay status in response to increasing amounts of data received by the polled sensor to decrease the rate of time change in increasing subsequent polls of the sensor. The method further includes the step of maintaining the recorded time delay status in response to a consistent amount of data received by the polled sensor to maintain a consistent interval of time between consecutive polls of the sensor.

In further accordance with the invention, a computer system for processing data received by a plurality of sensors comprises apparatus coupled with the sensors for polling the sensors to collect and record data accumulated by each sensor. The polling apparatus comprises a memory unit having a plurality of sensor buffer stores each associated with a sensor and each recording a time delay state identifying the time interval between consecutive polls of the sensor and a timer state identifying a period of time remaining to the next poll of the sensor. The polling apparatus also comprises a central processor for decrementing the recorded timer state and polling the sensor in response to a null state of the timer state and for setting both time delay and timer states recorded in a sensor buffer store in accordance with proportional relationships of the polled sensor data with the data capacity of an associated sensor buffer store vary the rate of change of an interval of time in polling a sensor.

DESCRIPTION OF THE DRAWING

The foregoing, as well as other objects, features, and advantages of the invention will be more apparent from a description of the drawing in which:

FIG. 1 is a block diagram of a computer system embodying the principles of the instant invention;

FIG. 2 illustrates a table utilized by the computer system set forth in FIG. 1 to vary the rate of time changes in polling sensors;

DESCRIPTION OF THE INVENTION

1. Apparatus Description

Figure 3:
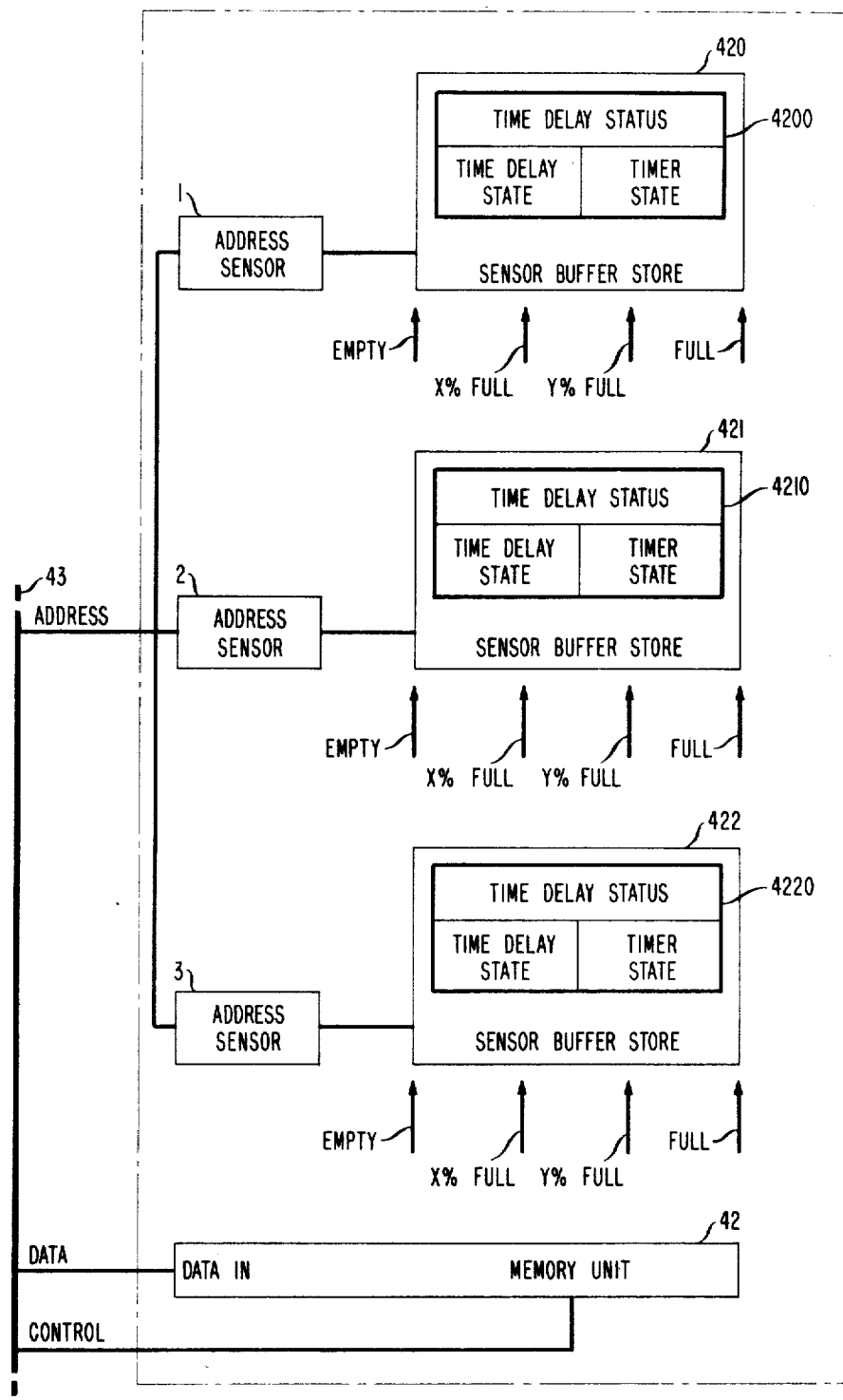
FIG. 3 illustrates a sensor buffer store layout of the central processor memory unit set forth in FIG. 1.

Referring to the drawing, and more specifically to FIG. 1 of the drawing, computer system 100 set forth therein is intended for use in processing data that is received and stored in a number of sensors 1, 2, 3. Each sensor 1, 2, 3 is coupled by lines 10, 30 or data links 21, 31, or the combination thereof, with equipment such as for example, telephone switching equipment. The telephone switching equipment not shown in the drawing and which is not necessary for an understanding of the invention, generates varying amounts of data which is received over lines 10, 30 and the data links 21, 31 and stored in sensors 1, 2, 3. Sensors for use with telephone switching equipment have been described in the prior art and need not be described in detail for an understanding of the present invention. For example, an article by J. J. Kleber and W. B. Perkinson published in the July/August 1980 issue of *Bell Laboratories Record*, page 236, and entitled "No. 1A AMARC: At the Center of Billing Data Collection" describes a number of sensors and the functions thereof used to receive telephone switching system data that is subsequently processed to obtain customer billing information.

As set forth in FIG. 1, each sensor 1, 2, 3 is coupled by a data communication channel 14, 24, 34 respectively, with a central processor 4 arranged to process data generated by equipment coupled with sensors 1, 2, 3. Central processor 4 includes a stored program central processing unit 41 interconnected by a bus 43 through address, control, and data leads with a memory unit 42. In addition, central processor 41 and memory unit 42 are interconnected by bus 43 with asynchronous multiplexer interface unit 40 which is arranged to interface with and interconnect a number of data communications channels 14, 24, 34 with central processor 4. It is intended that central processor 4 and the component parts thereof such as asynchronous multiplexer interface unit 40, central processor 41, and memory unit 42 be conventional and well known. For example, a *Terminals and Communications Handbook*, copyright 1979, published by the Digital Equipment Corporation of Maynard, Mass., describes in Chapter 7, page 145, a conventional type of such a central processor. The present invention is not limited for use with the central processor set forth in the aforementioned handbook but may be utilized with other types of central processors as well.

Referring to FIG. 3 of the drawing, memory unit 42 includes a number of sensor buffer stores 420, 421, 422 each associated with a corresponding one of sensors 1, 2, 3. Thus, sensor buffer store 420 is associated with and is arranged to record the data received by sensor 1. Similarly, sensor buffer store 421 and sensor buffer store 422 are associated with and arranged to record respectively, data received by sensors 2 and 3. In the well known manner, address information appearing on bus 43 selects one of the sensor buffer stores 420, 421, 422 and control information enables memory unit 42 to store sensor data appearing on bus 43 within the addressed sensor buffer store 420, 421, 422. Recorded within each sensor buffer store is an adaptive time delay status 4200, 4210, 4220 controlling the interval of time between consecutive polls of the sensor associated with the sensor buffer store. Each recorded adaptive time delay status 4200, 4210, 4220 comprises a time delay state identifying a time interval between consecutive polls of the sensor associated with the sensor buffer store and a timer state identifying a period of time remaining to the next poll of the sensor,

2. General System Operation

In order to process the data received by sensors 1, 2, 3, FIG. 1, central processor 4 polls each sensor to collect and record the data accumulated by the sensor. The time interval between consecutive polls of a sensor is changed in accordance with the amount of data having been received by the sensor. If a sensor for example, sensor 1, begins to receive an increasing amount of data central processor 4 decreases the interval of time between consecutive polls and begins to poll sensor 1 at an increasing rate so that sensor 1 data does not overflow the limited sensor store capacity and thereby be lost. If on the other hand sensor 2 begins to receive a decreasing amount of data over data link 21, central processor 4 increases the interval of time between consecutive polls and begins to poll sensor 2 less often. When a sensor such as sensor 3 continues to receive a constant amount of data, central processor 4 maintains a constant interval of time between consecutive polls of sensor 3. Thus, central processor 4 by regulating the time interval and the rate of changing time intervals between consecutive sensor polls is able to optimize the data load offered central processor 4 and improve the efficiency of central processing unit 41 by minimizing time spent polling sensors.

In order to illustrate the operation of computer system 100, it is assumed that the time delay and timer states, FIG. 3, recorded in each sensor buffer store 420, 421, 422 of memory unit 42 are set to the value of 3 at 1.7, respectively. Furthermore, it is assumed that sensor 1 is being offered a large load of received data and is nearly full. Sensor 2 is being offered a small load of received data and is almost empty of data. Finally, sensor 3 is being offered an intermediate load of received data and is approximately half full of data.

Central processing unit 41 initiates the polling sequence by addressing memory unit 42 and reading the time delay state 3 and timer state 1.7 from addressed sensor 1 buffer store 420 into central processing unit 41. The read timer state is then decremented by an amount Z herein assumed to be 0.1. Since the decremented timer state is other than the null state, assumed for purpose of illustration to be 0.0, both the time delay state 3 and the decremented timer state 1.6 are transmitted from central processing unit 41 to memory unit 42 and stored in addressed sensor buffer store 420. Similarly, central processing unit 41 reads the time delay state 3 and timer state 1.7 recorded in sensor buffer stores 421, 422 of memory unit 42, decrements the read timer state by 0.1 and stores both time delay state 3 and decremented timer state 1.6 in sensor buffer store 421 and 422.

Central processing unit 42 continues during the polling sequence to sequentially read the time delay status states 4200, 4210, 4220 of each sensor buffer store 420, 421, 422 and decrement the timer states identifying the time remaining to the next poll of the sensor. When the timer state read from sensor buffer store 420 is decremented to the null state, central processing unit 42 responds by addressing asynchronous multiplexer interface unit 40, FIG. 1, to assume a transmit state thereby enabling central processor 4 to transmit a poll command over data communication channel 14 to sensor 1. Asynchronous multiplexer interface unit 40 is then addressed and controlled to receive data and sensor 1 then transmits the accumulated received data over data communication channel 14 to central processor 4.

The sensor 1 data collected by central processor 4 and recorded in sensor store buffer 420, FIG. 3, is counted by central processing unit 41 and compared with the capacity of sensor buffer store 420. Since it was assumed that sensor 1 was nearly full of data, central processing unit 41 determines from the proportional relationship of received sensor 1 data with the capacity of sensor buffer store 420 that sensor buffer store 420 is greater than Y % full and the rate of polling sensor 1 should be increased. Accordingly, central processing unit 41 enters the Adaptive Time Delay Status Table set forth in FIG. 2 at the row identified by the read time delay state 3 and determines that the time delay state for the nearly full sensor 1 should be decreased from 3 to 2. Central processing unit 41 further determines from the table of FIG. 2 that a timer state of 0.9 is associated with time delay state 2 and then sets the time delay and timer states respectively to 2 and 0.9 and transmits the set time delay and timer states to memory 42 to be stored in sensor buffer store 420.

As the poll sequence continues, sensor buffer store 421 time delay and timer states are read into central processing unit 41 and the timer state decremented by 0.1. When the read timer state is decremented to the null state, sensor 2 is polled and the received data collected and recorded by central processor 4. The collected and recorded data is compared in a proportional relationship with the data capacity of sensor buffer store 421. Since it was assumed that sensor 2 was nearly empty then sensor buffer store 421 is less than X % full and the rate of polling sensor 2 should be decreased. Accordingly, central processing unit 41 enters the Adaptive Time Delay Status Table of FIG. 2 at the row identified by the read time delay state 3 and determines that the time delay state for the nearly empty sensor 2 should be increased from 3 to 4. Central processing unit 41 then sets the time delay state for sensor 2 to 4 and the timer state to 2.7 and transmits the set time delay and timer states to memory 42 to be stored in sensor buffer store 421. When the read and decremented timer state of sensor buffer store 422 is in the null state, the proportional relationship of data collected and recorded from polled sensor 3 with the data capacity of sensor buffer store 422 indicates that sensor 3 has only partially filled with data during the time interval since the last poll. Central processing unit 41 then enters the Adaptive Time Delay Status Table at row 3 identified by the read time delay state 3 and determines that the time delay state for sensor 3 should remain at the value of 3. Accordingly, the time delay and timer states are set to 3 and 1.7 respectively, transmitted to memory unit 42 and stored as time delay status 4220 in sensor buffer store 422, FIG. 3.

If the data received by sensor 1 continues to increase and sensor buffer store 420 is nearly full every time sensor 1 is polled then the time delay and timer states, currently set to 2 and 0.9, respectively, are decreased during the next consecutive poll to 1 and 0.4 as set forth in the Adaptive Time Delay Status Table of FIG. 2. When the timer state recorded in sensor buffer store 420 is decremented from 0.4 to 0.0 and polled sensor 1 is still nearly full of received data then the time delay and timer states are set to 0 and 0.0 respectively, and stored in sensor buffer store 420 so that time delay status 4200 may control central processor 4 to poll sensor 1 each time the recorded time delay status 4200 is read into central processing unit 41. Central processor 4 responds to the increasing amount of data received by sensor 1 by decreasing the rate of the time interval between consecutive polls so as to increase the number of times that sensor 1 is polled. Thus, the time delay state is decreased from the assumed initial value of 3 to 2, 1 and then 0. In addition, the timer state 1.7 originally corresponding to the time delay state 3 is changed by a decreasing rate of change of 0.8, 0.5 and 0.4 from 1.7 to 0.9 then to 0.4 and finally to 0. The time interval between consecutive polls of sensor 1 has been decreased to thereby increase the polling of sensor 1 and guard against sensor 1 from overflowing with data.

In contrast to sensor 1, the data received by sensor 2 was assumed to be decreasing such that sensor 2 was nearly empty of received data during each poll. Accordingly, the time delay and timer states recorded in sensor buffer store 421 and currently set to 4 and 2.7 respectively, are increased during succeeding polls of sensor 2 to the time delay states 5, 6, 7 and the corresponding timer states of 4.2, 6.2 and 9.0. Central processor 4 is thereby controlled by time delay status 4210 recorded in sensor buffer store 421 to increase the rate of change of time by the values 1.5, 2.0 and 2.8 in delaying subsequent polls of sensor 2.

Since sensor 3 has been assumed to receive a constant amount of data, the time delay and timer states recorded in the partially full sensor buffer store 422 continue to be reset during each poll of sensor 3 to the values of 3 and 1.7 respectively. Thus, sensor 3 is polled with a constant interval of time between consecutive polls.

As the amount of data received by sensors 1, 2, 3 varies, central processor 4 dynamically regulates the time delay status 4200, 4210, 4220 recorded in sensor buffer stores 420, 421, 422 to control the interval of time between consecutive polls and optimize the data load offered by sensors 1, 2, 3 to central processor 4.

3. Detailed System Operation

Figure 4:
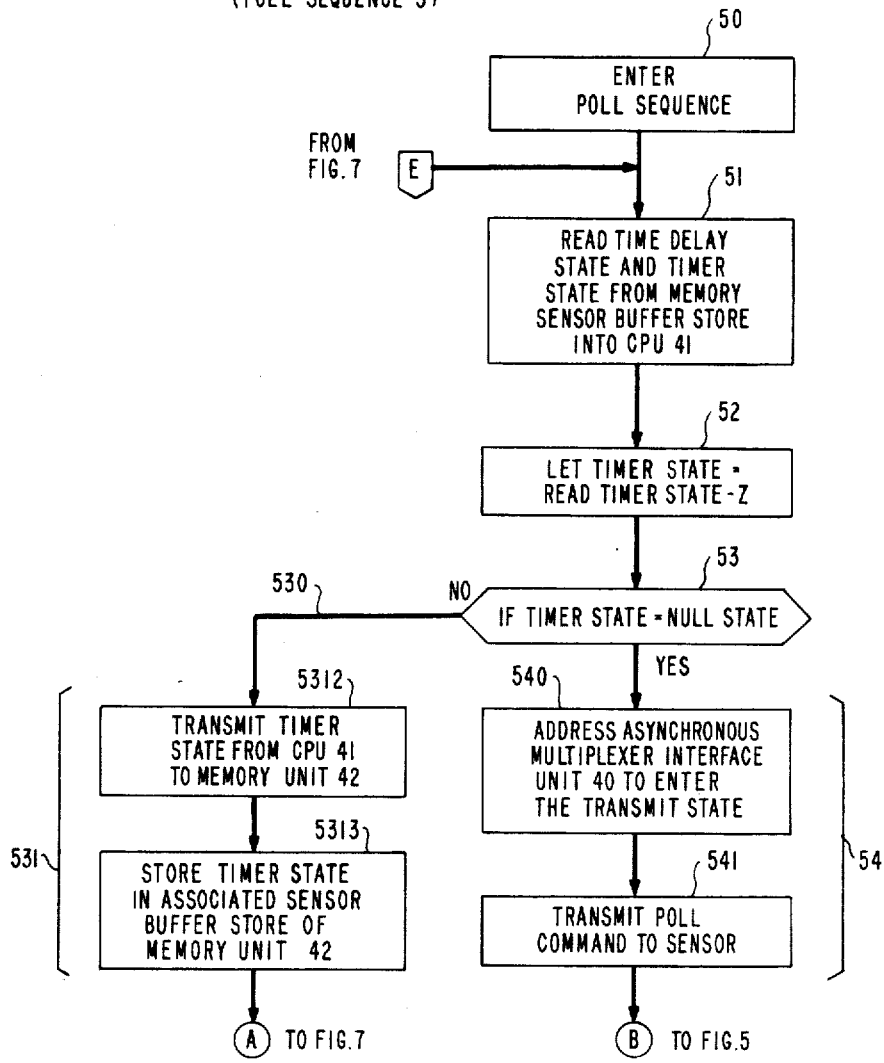
FIGS. 4, 5, 6 and 7 illustrate a flow chart of the computer system polling sequence of the sensors set forth in FIG. 1.
Figure 7:
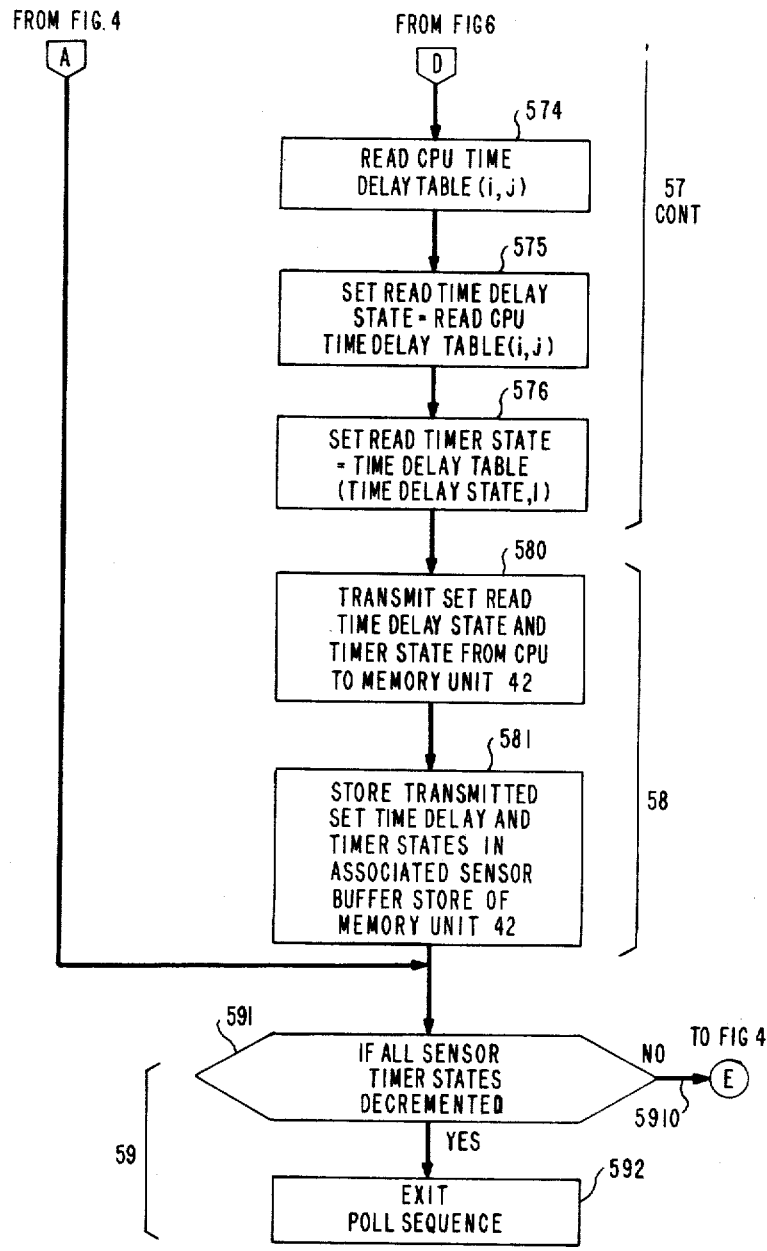

Referring now to FIG. 4 of the drawing, central processing unit 4 initiates sensor poll sequence 5 by entering a poll sequence at step 50. A time delay status comprising a time delay state and a timer state is read at step 51 from a sensor buffer store of memory 42 over bus 43 into central processing unit 41. Central processing unit 41 then decrements the read timer state identifying the time remaining to the next poll of the sensor at step 52 by subtracting the value of Z therefrom where Z is a value of time determined by the characteristics of computer system 100. If the decremented timer state is other than the null state, central processing unit 41, steps 53, 530, and 531, transmits the decremented timer state over bus 43 and stores the value thereof in the sensor buffer store. Central processing unit 41 then continues, steps 591, 5910, FIG. 7, poll sequence 5, by reading the time delay and timer states, step 51, FIG. 4, from another sensor buffer. After all sensor buffer store time delay and timer states have been read central processing unit 41 then exits poll sequence 5 at steps 591 and 592 to perform other system functions.

Figure 5:
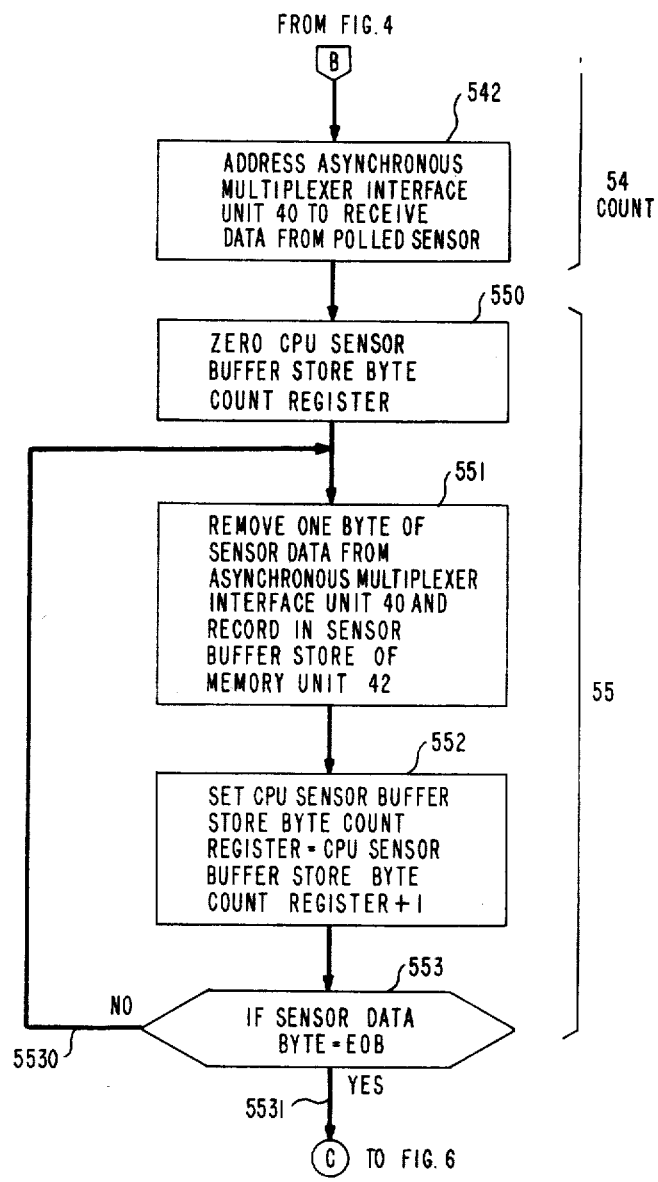

If the decremented timer state, step 53, is determined to be in the null state, central processor 4 will poll the sensor associated with sensor buffer store from which the time delay and timer states were read in step 54. In initiating the step 54 of transmitting a poll command to the sensor, central processing unit 41 addresses and controls asynchronous multiplexer interface unit 40, step 540, over bus 43 to enter the transmit state. Central processor 4, step 541, then transmits a poll command from asynchronous multiplexer interface unit 40 over the appropriate one of data communication channels 14, 24, 34 to the polled sensor. At step 542, FIG. 5, central processing unit 41 addresses and controls asynchronous multiplexer interface unit 40 over bus 43 to enter a receive state to collect data over the appropriate data communication channel from the polled sensor.

Central processing unit 41 in recording the data collected from the polled sensor, zeros a register, step 550, assigned to accumulate a byte count of the sensor data collected and recorded, step 55, in the memory unit sensor buffer store associated with the polled sensor. Each byte of collected sensor data, step 551, is removed from asynchronous multiplexer interface unit 40 over bus 43 and recorded in the associated sensor buffer store. As each byte of polled sensor data is recorded in the appropriate sensor buffer store the central processing unit sensor buffer store byte count register, step 552, is increased by 1. The counting is continued via steps 551, 552, 553 and path 5530 until an end of block signal is detected at step 553 thereby indicating that all of the polled sensor data has been collected and recorded in the associated sensor buffer store of memory unit 42.

Figure 6:
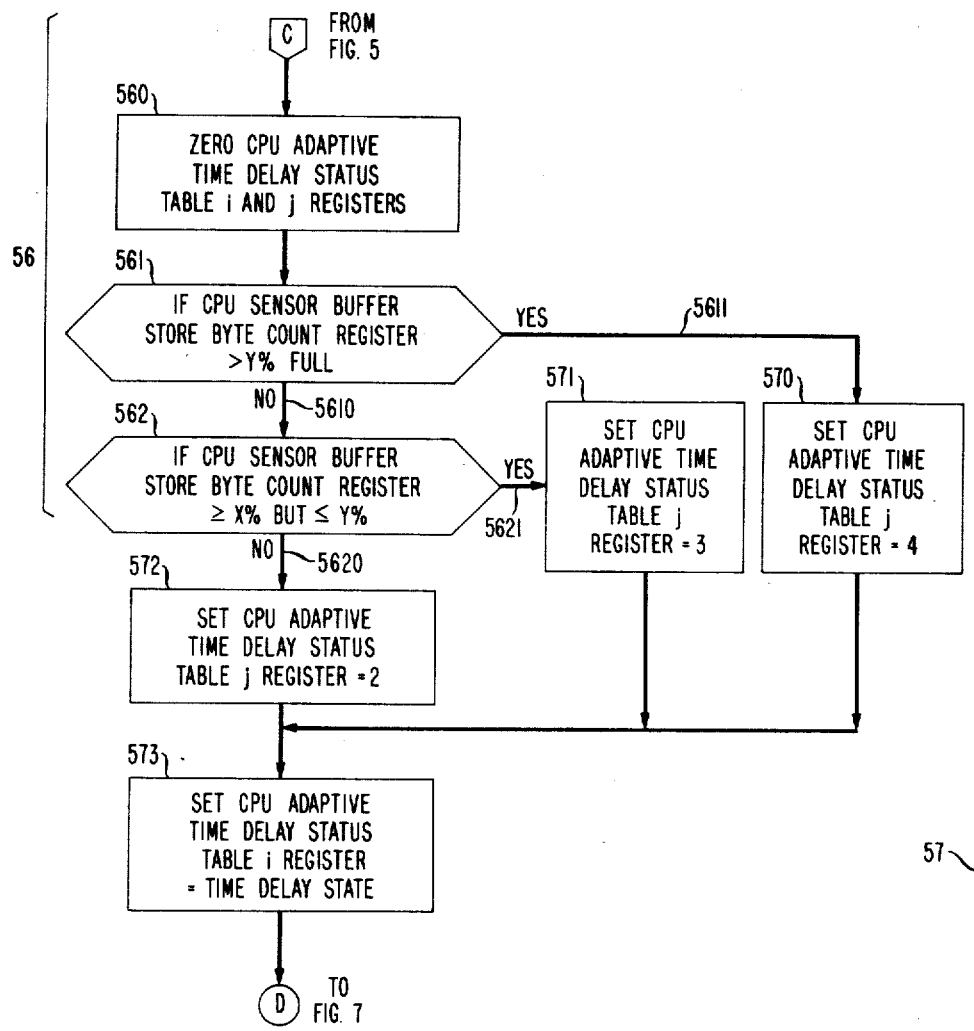

When the end of block signal has been detected, central processing unit 41, FIG. 6, step 560, zeros Adaptive Time Delay Status Table i and j registers prior to setting the time delay status, step 57, to control subsequent polling of the sensor. If the central processing unit 41 sensor buffer store byte count register representing the amount of data received by the polled sensor is greater than Y % full, step 561, then the central processing unit 41 sets Adaptive Time Delay Status Table j register to 4, step 570. The values of X % and Y % are statistically chosen with respect to capacity of the sensor and the data processing capability of central processor 4. Thus, central processor 4 processes the received sensor data most efficiently when each block of recorded data contains a number of bytes of data in the range greater than or equal to X % full but less than or equal to Y % full. Typically, X % and Y % may have the values of 80 and 90 respectively. When the number of bytes of received sensor data is greater than the value of Y % then the sensor must be polled more often to prevent loss of data. If the number of bytes of received sensor data is less than the value of X %, central processor 4 would be operating less efficiently in that more processor time is required to poll the sensor to receive small blocks of data and less processor time is available to do other tasks. Thus, the sensor should be polled less often. Since the most efficient operation of central processor 4 occurs when the received sensor data is in the range between X %, and Y % central processor 4 effects changes of the time interval in polling sensors to maintain the sensor data recorded in each sensor buffer store in the range between X % and Y % so as to optimize the data load offered central processor 4.

If the central processing unit 41 sensor buffer store byte count register is equal to or less than Y % full but greater than or equal to X % full, step 562, then the Adaptive Time Delay Status Table j register is set to 3, step 571. Should the sensor buffer store byte count register indicate that the polled sensor is less than X % full, the central processing unit 41, step 572, sets the Adaptive Time Delay Status Table j register to 2.

Once the Adaptive Time Delay Status Table j register has been set, steps 570, 571, 572, central processing unit 41 then sets the Adaptive Time Delay Status Table i register, step 573, to the value of the time delay state previously read from the sensor buffer store associated with the polled sensor. Central processing unit 41, FIG. 7 step 574, reads the Adaptive Time Delay Status Table of FIG. 2 at the row i that corresponds to the read time delay state and at the column j that corresponds to the amount of data that was collected and recorded from the polled sensor. If the sensor buffer store was full of data such that the Adaptive Time Delay Status Table j register, step 574, was set to 4 then the present time delay state is decreased by 1 so as to increase the polling rate of the sensor and thereby prevent loss of data. It is to be understood that the Adaptive Time Delay Status Table can be structured such that the change of the time delay state can be more than 1 if the characteristics of the sensor and data traffic so warrant.

When the Adaptive Time Delay Status Table j register, step 571, is set to 3, the present time delay state is retained to maintain the sensor data in the range between X % and Y %. Should the Adaptive Time Delay Status Table j register, step 572, be set to 2, then the present time delay state is increased by 1 to increase the time between successive polls of the sensor.

The time delay state, step 575, is set to the value read from the Adaptive Time Delay Status Table at the row and column defined by the Adaptive Time Delay Status i and j registers and the read timer state is set, step 576, to the table value of the row defined by the set time delay state and column 1. Central processing unit 41 then transmits, step 580, the set time delay and timer states over bus 43 to memory unit 42 and stores the values thereof, step 581, in the sensor buffer store associated with the polled sensor.

Poll sequence 5 then exits the poll sequence, step 591, or reads the time delay and timer states, path 5910, from the next sensor buffer store, step 51, into central processing unit 41.

SUMMARY

It is obvious from the foregoing that the facility, economy, and efficiency of computer systems may be substantially enhanced by the provision of a computer system arranged to optimize the data load offered by sensors to a central processor. It is further obvious from the foregoing that the aforesaid computer system arranged to dynamically vary the time of polling each sensor of a plurality of sensors to smooth the data load offered by the sensors to a central processor improves the efficiency of the central processor by optimizing the central processor polling time and allowing more data processing time.

While the apparatus and method of the invention has been disclosed in a computer system for use with telephone switching equipment, it is to be understood that such an embodiment is intended to be illustrative of the principles of the invention in that numerous other arrangements may be devised with those skilled in the art without departing from the spirit and scope of the invention.

What is claimed is:

1. A method of polling sensors (1, 2, 3) receiving data intended for processing by a central processor (4) coupled with the sensors comprising the step of
    polling (5) the sensors to collect and record the sensor data in sensor buffer stores (421, 422, 433) each associated with a sensor and each located in a memory unit (42) of the central processor
    characterized in that
    said polling step comprises the steps of
    recording (51, 52, 53, 54, 58) in each sensor buffer store an adaptive time delay status controlling an interval of time between consecutive polls of the sensor associated with the sensor buffer store, and
    dynamically regulating (55, 56, 57) said recorded time delay status in accordance with a proportional relationship of the received sensor data with the data capacity of the sensor buffer store associated with the sensor to optimize the data load offered by the sensors to the central processor.

2. The sensor polling method of claim 1
    characterized in that
    said recording step further comprises the step of
    reading (51) a time delay state identifying a time interval between consecutive polls of the sensor and a timer state identifying a period of time remaining to the next poll of the sensor from the associated sensor buffer store of the memory unit into a processing unit of the central processor.

3. The sensor polling method of claim 2
    characterized in that
    said recording step further comprises the step of
    decrementing (52, 53, 531) said read timer state and storing said decremented timer state in the associated sensor buffer store when said decremented timer state is other than a null state.

4. The sensor polling method of claim 3
    characterized in that
    said recording step further comprises the step of
    transmitting (54) a poll command to the sensor in response to a null state registered in said decremented timer state.

5. The sensor polling method of claim 4
    characterized in that
    said regulating step comprises the steps of
    counting (55, 56) data collected and recorded in the sensor buffer store associated with the sensor and comparing said data count with a data capacity of the sensor buffer store, and
    setting (57) the time delay and timer states in accordance with proportional relationships of said counted sensor data with said sensor buffer store data capacity to regulate the interval of time between successive polls of the sensor.

6. The sensor polling method of claim 5
    characterized in that
    said recording step further comprises the step of
    transmitting (58) said set time delay and timer states from the processing unit to the memory unit and storing said set time delay and timer states in the sensor buffer store associated with the polled sensor.

7. A method of polling sensors (1, 2, 3) receiving data intended for processing by a central processor (4) coupled with the sensors comprising the step of
    polling (5) the sensors to collect and record the sensor data in sensor buffer stores (421, 422, 423) each associated with a sensor and each located in a memory unit (42) of the central processor
    characterized in that
    said polling step comprises the steps of
    reading (51) a time delay state identifying a time interval between consecutive polls of a sensor and a timer state identifying a period of time remaining to the next poll of the sensor from a sensor buffer store associated with the sensor of the memory unit into a processing unit of the central processor,
    decrementing (52, 53, 54) said read timer state and transmitting a poll command to the sensor in response to a null state registered in said decremented timer state,
    setting (55, 56, 57) said read time delay and timer states in accordance with proportional relationships of the polled sensor data with the data capacity of the sensor buffer store to regulate and optimize the data load offered by the sensors to the central processor, and
    transmitting (58) said set time delay and timer states from the processing unit and storing said set time delay and timer states in the sensor buffer store of the memory unit.

8. The sensor polling method of claim 7
    characterized in that
    said setting step comprises the steps of
    counting (55) bytes of sensor data collected and recorded in the sensor buffer store of the polled sensor,
    determining (56) a proportional relationship of said counted bytes of sensor data with the data byte capacity of the sensor buffer store,
    incrementing (572, 573, 574, 575, 576) said read time delay state when said determined proportional relationship is less than a first defined value and setting said read timer state to increase the period of time to the next poll of the sensor, decrementing (570, 573, 574, 575, 576) said read time delay state when said determined proportional relationship is greater than a second defined value and setting said read timer state to decrease the period of time to the next poll of the sensor, and retaining (571, 573, 574, 575, 576) said read timer delay state when said determined proportional relationship is greater than or equal to said first defined value and less than or equal to said second defined value and setting said read timer state to the value set in the previous poll of the sensor.

9. A method of polling sensors (1, 2, 3) receiving data intended for processing by a central processor (4) coupled with the sensors comprising the step of polling (5) the sensors to collect and record the sensor data in sensor buffer stores (421, 422, 423) each associated with a sensor and each located in a memory unit (42) of the central processor characterized in that said polling step comprises the steps of reading (51) a time delay state identifying an interval of time between consecutive polls of a sensor and a timer state identifying an interval of time remaining to the next poll of the sensor from a sensor buffer store associated with the sensor of the memory unit into a processing unit of the central processor, decrementing (52, 53, 531) said read timer state and storing said decremented timer state in the sensor buffer store when said decremented timer state is other than a null state, transmitting (54) a poll command to the sensor in response to a null state registered in said decremented timer state, counting (55) bytes of sensor data collected and recorded in the sensor buffer store in response to said transmitted poll command, incrementing (55, 572, 573, 574, 575, 576) said read time delay state when a proportional relationship of said counted bytes of sensor data with the data byte capacity of the sensor buffer store is less than a first defined value and setting said timer state to increase the period of time to the next poll of the sensor, decrementing (56, 570, 573, 574, 575, 576) said read time delay state when the proportional relationship of said counted bytes of sensor data with the data byte capacity of the sensor buffer store is greater than a second defined value and setting said timer state to decrease the period of time to the next poll of the sensor, retaining (56, 571, 573, 574, 575, 576) said read time delay state when the proportional relationship of said counted bytes of sensor data with the data byte capacity of the sensor buffer store is greater than or equal to said first defined value and less than or equal to said second defined value and setting said timer state to the value set in the previous poll of the sensor, and transmitting (58) said set time delay and timer states from said processing unit to said memory unit and storing said set time delay and timer states in the sensor buffer store.

10. A method of polling a plurality of sensors (1, 2, 3) each coupled with a central processor intended for processing data comprising the step of polling the sensors to collect and record data received by each sensor in a sensor buffer store of a memory unit of the central processor characterized in that said polling step comprises the steps of recording (51, 52, 53, 54, 58) in the sensor buffer store an adaptive time delay status controlling a time interval between polling the sensors, incrementing (55, 56, 572, 573, 574, 575, 576) said recorded time delay status in response to decreasing amounts of data received by a polled one of the sensors to increase the time interval between subsequent polls of the sensor, decreasing (55, 56, 570, 573, 574, 575, 576) said recorded time delay status in response to increasing amounts of data received by a polled one of the sensors to decrease the time interval between subsequent polls of the sensor, and maintaining (55, 56, 571, 573, 574, 575, 576) said recorded time delay status in response to a constant amount of data received by a polled one of the sensors to maintain a constant interval of time between consecutive polls of the sensor.

11. A computer system (100) for processing data received by a plurality of sensors (1, 2, 3) comprising apparatus (4) coupled with the sensors for polling the sensors to collect and record the data accumulated by each sensor characterized in that said polling apparatus comprises means (42) for recording an adaptive time delay status individual to each sensor controlling an interval of time between consecutive polls of the sensor, and means (41) responsive to changes in amounts of data received by the sensors for dynamically regulating said adaptive time delay status in said recording means to vary a rate of time changes in polling the sensors and optimize the data load offered by the sensors to the computer system.

12. The computer system of claim 11 characterized in that said recording means comprises a memory unit (42) having a plurality of sensor buffer stores (420, 421, 422) each associated with one of the sensors to record sensor data and each recording a time delay state identifying the time interval between consecutive polls of the sensor and a timer state identifying a period of time remaining to the next sensor poll.

13. The computer system in claim 12 characterized in that said regulating means comprises a central processor (41) decrementing said recorded timer state and polling each sensor in response to a null of the timer state for setting both said time delay and timer states recorded in a sensor buffer store associated with a polled sensor in accordance with proportional relationships of the polled sensor data with the data capacity of the sensor buffer store to vary the rate of changing an interval of time in polling the sensor.

* * * * *